Sept. 15, 1925.

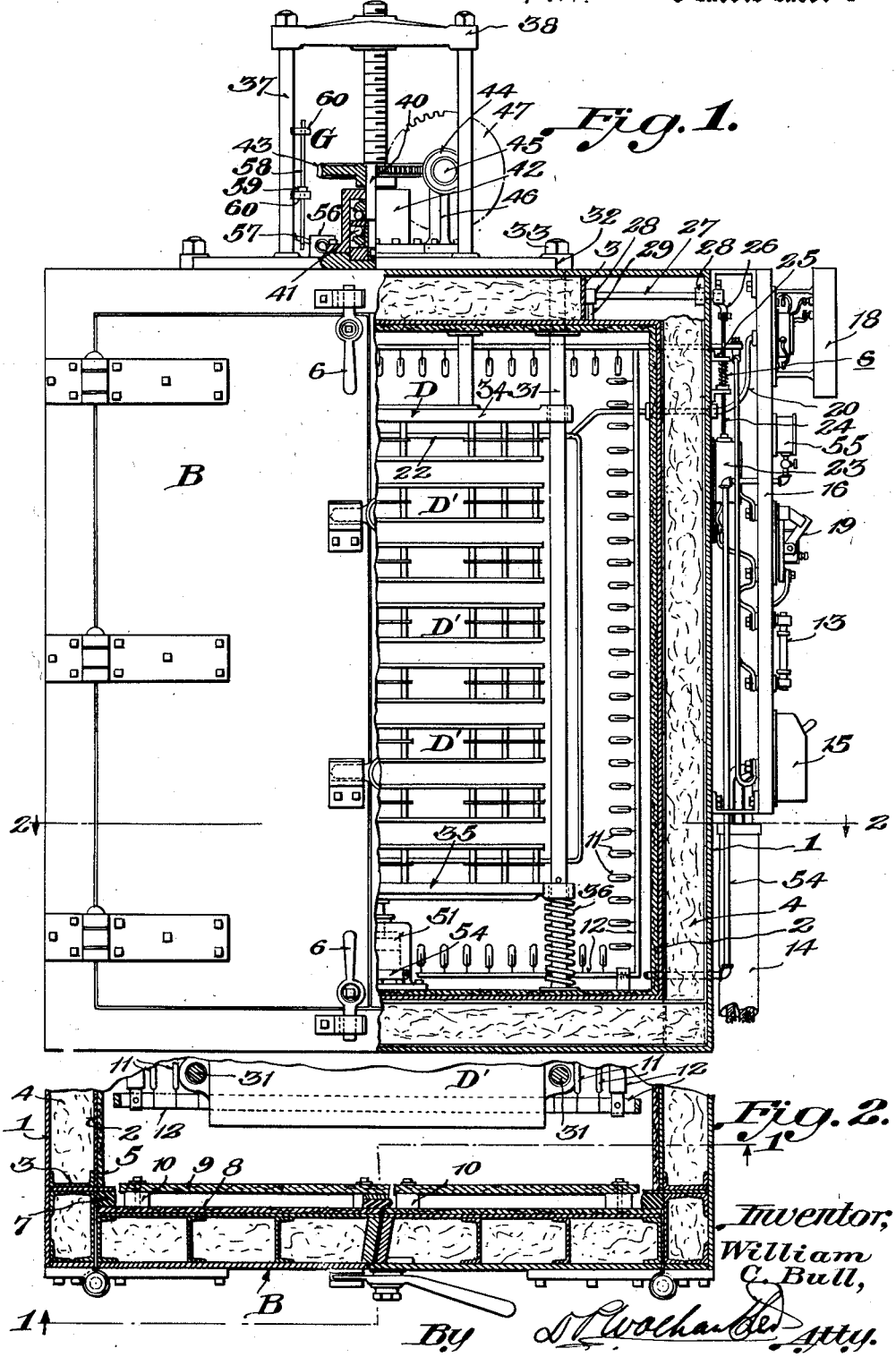

W. C. BULL 1,553,667

APPARATUS FOR FABRICATING REENFORCED GLASS

Filed June 26, 1924  8 Sheets-Sheet 2

Inventor;
William C. Bull,
By ᴅ. ᴛ. Woehan̄ Atty.

Sept. 15, 1925.
W. C. BULL
1,553,667
APPARATUS FOR FABRICATING REENFORCED GLASS
Filed June 26, 1924   8 Sheets-Sheet 3
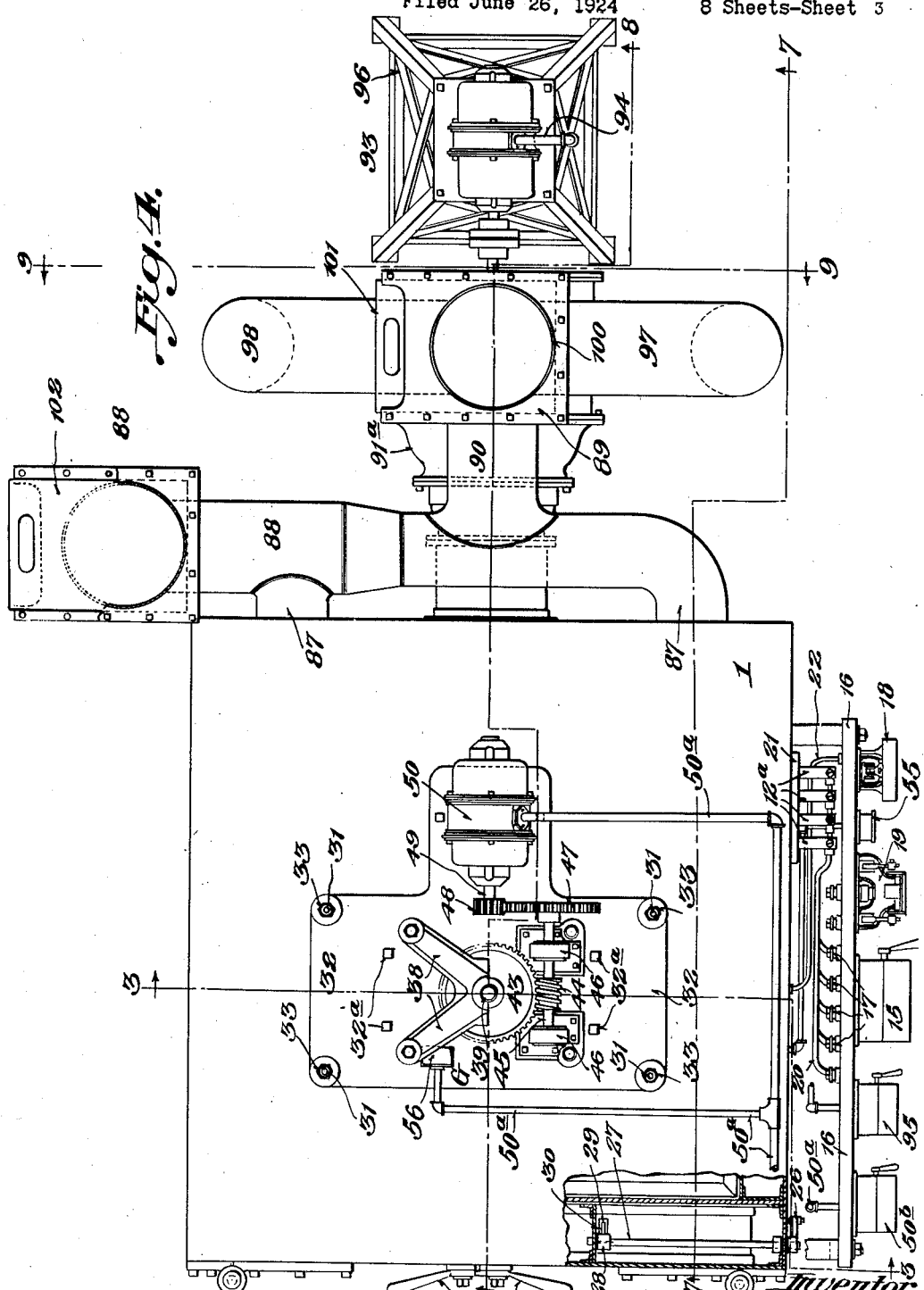

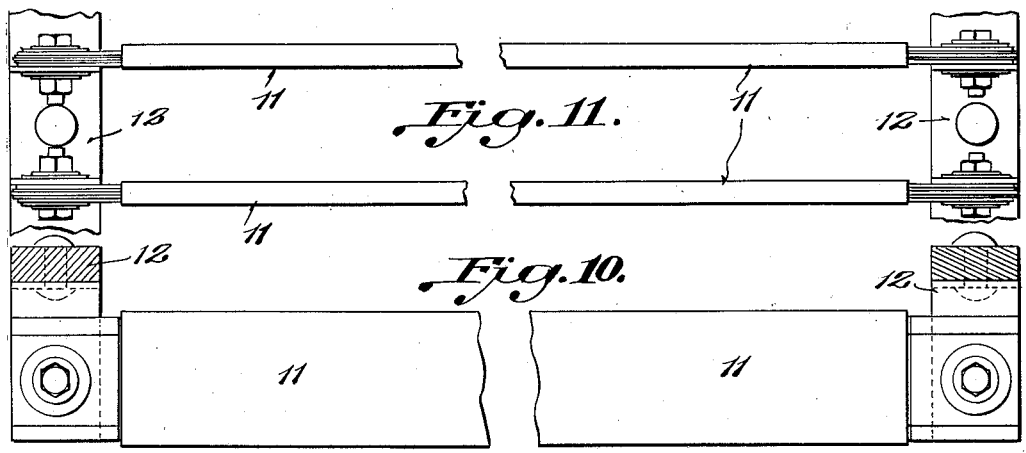
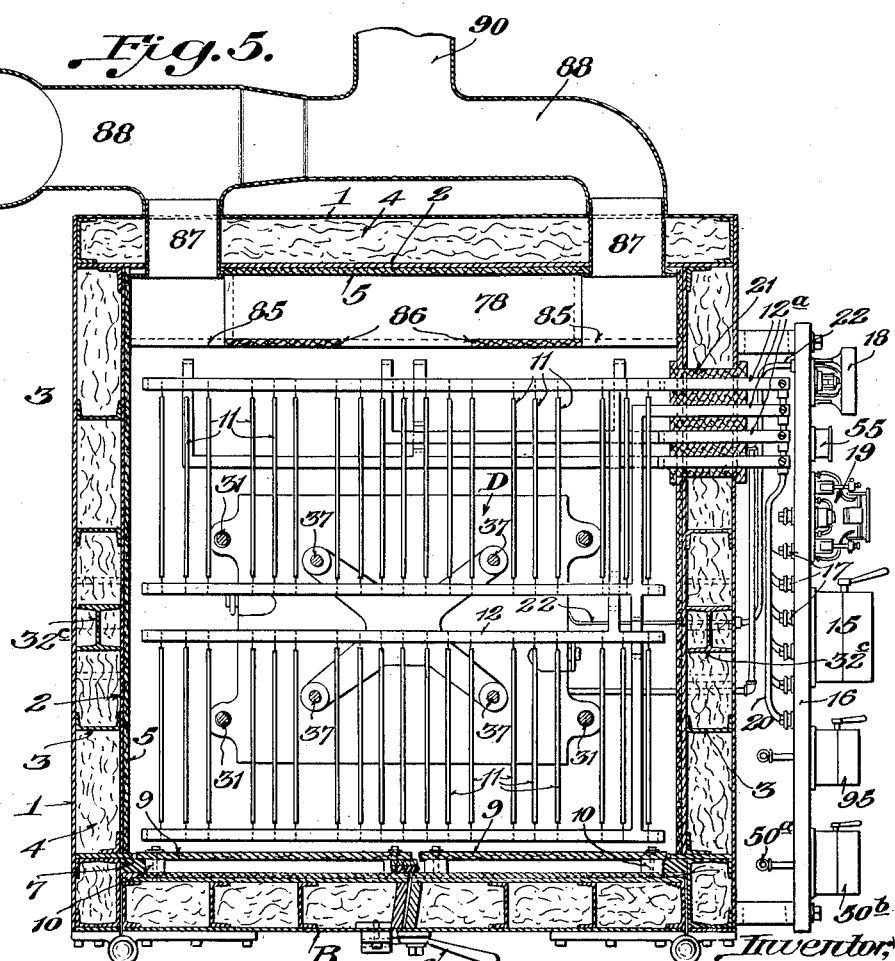

Sept. 15, 1925.                                                    1,553,667
                              W. C. BULL
             APPARATUS FOR FABRICATING REENFORCED GLASS
                         Filed June 26, 1924        8 Sheets-Sheet 5
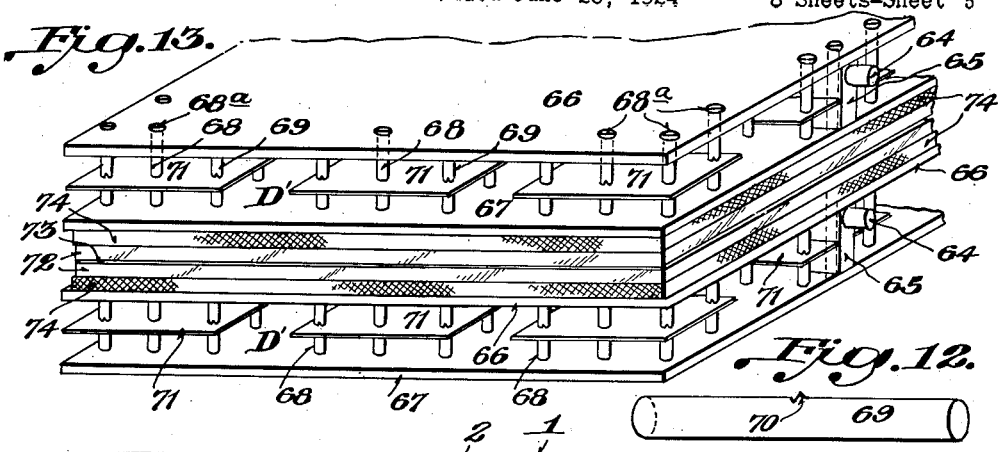
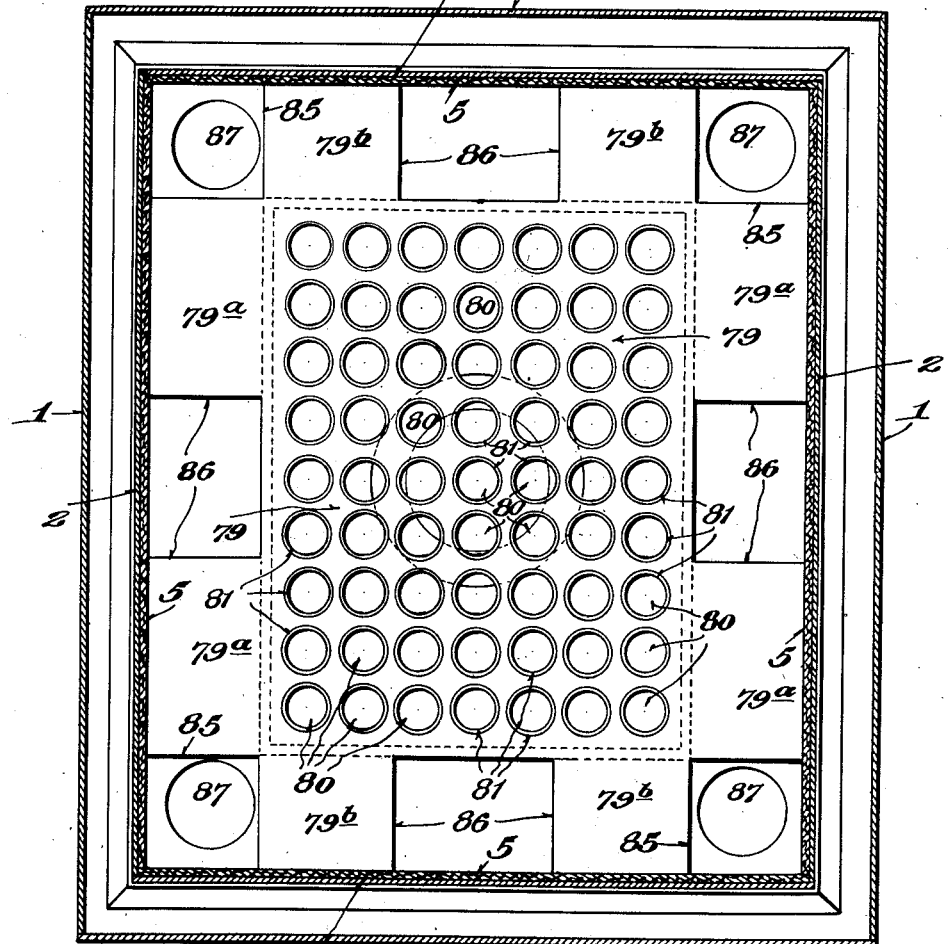
Inventor,
William C. Bull,
By [signature] Atty.

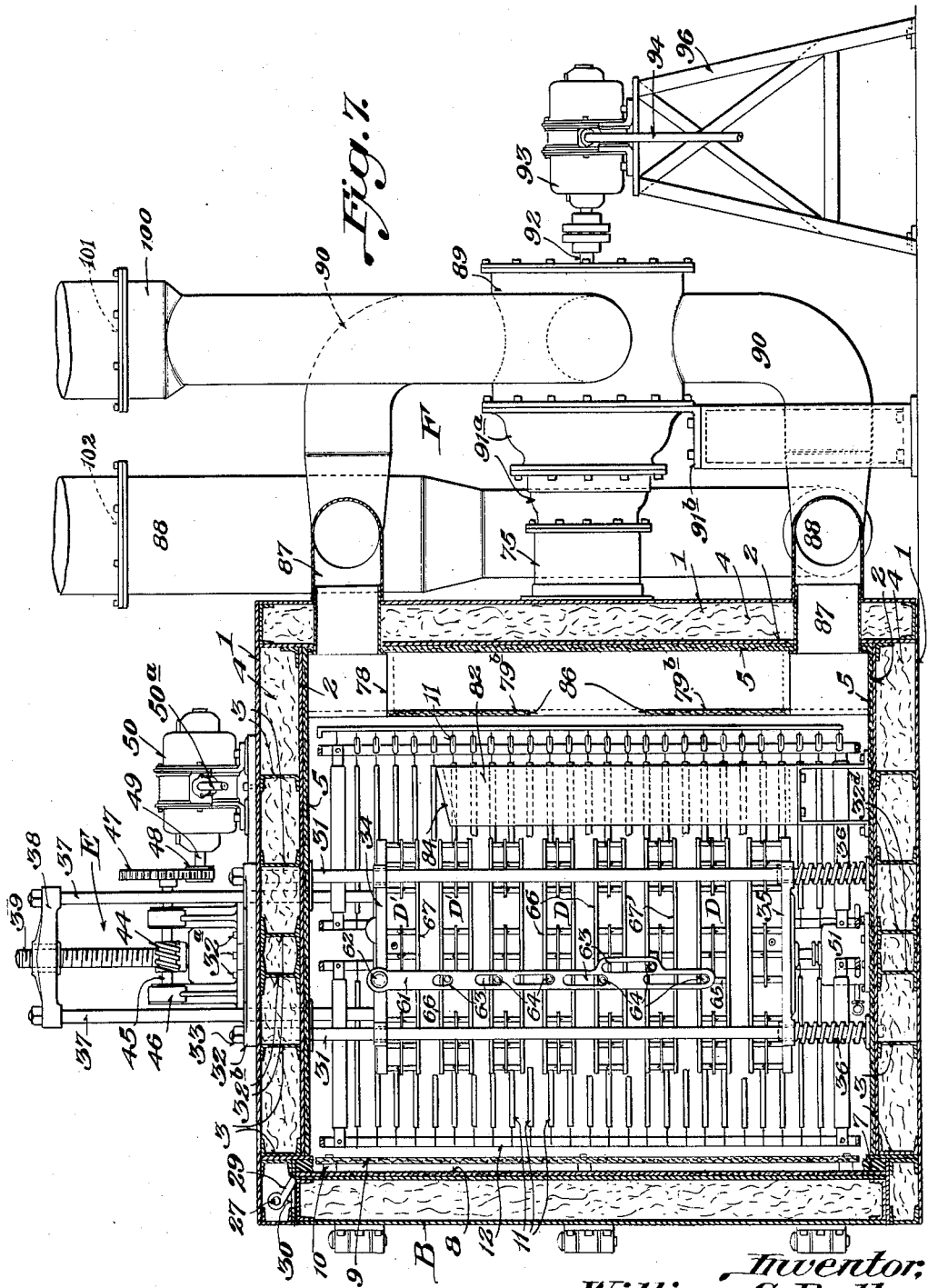

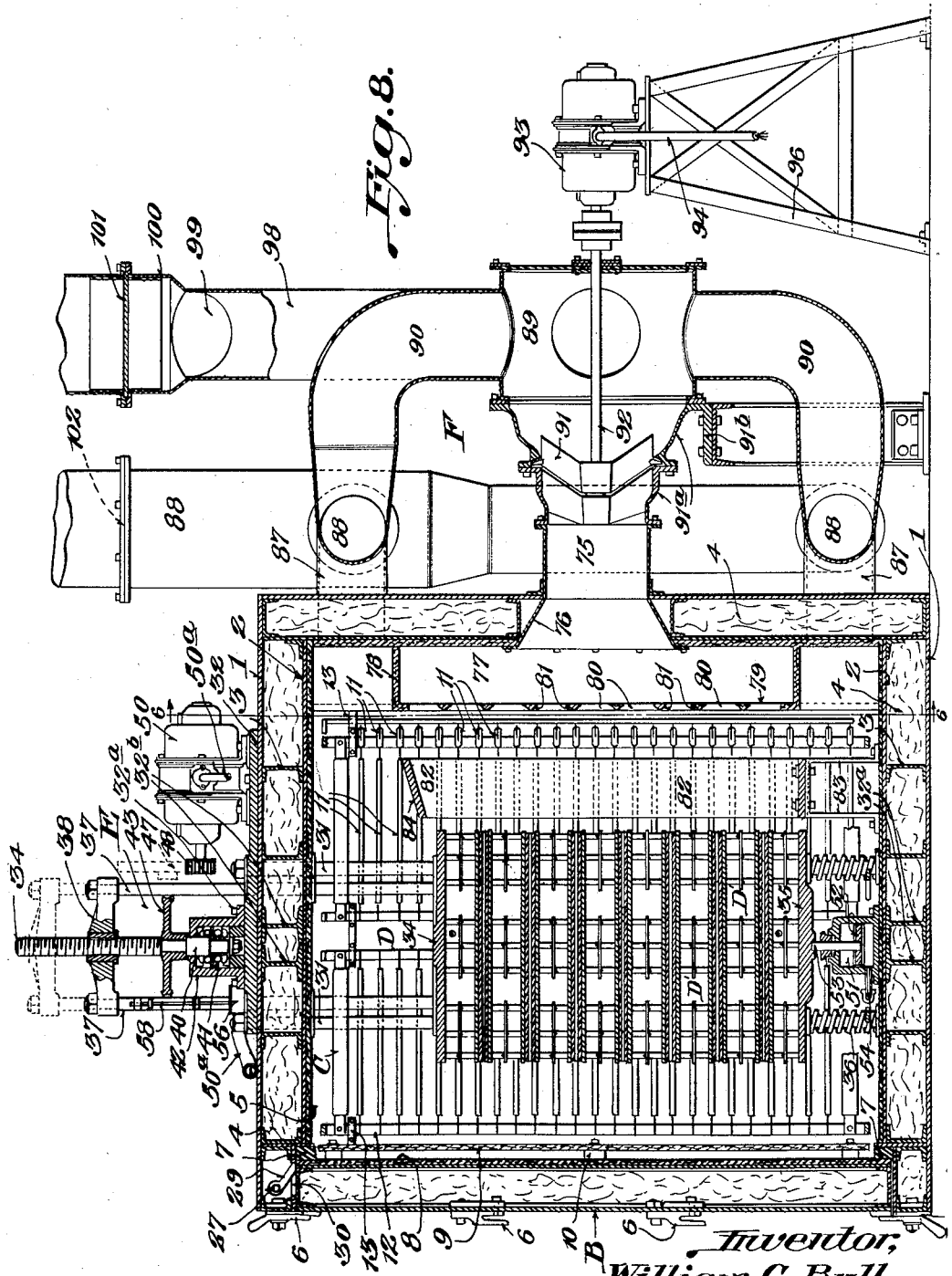

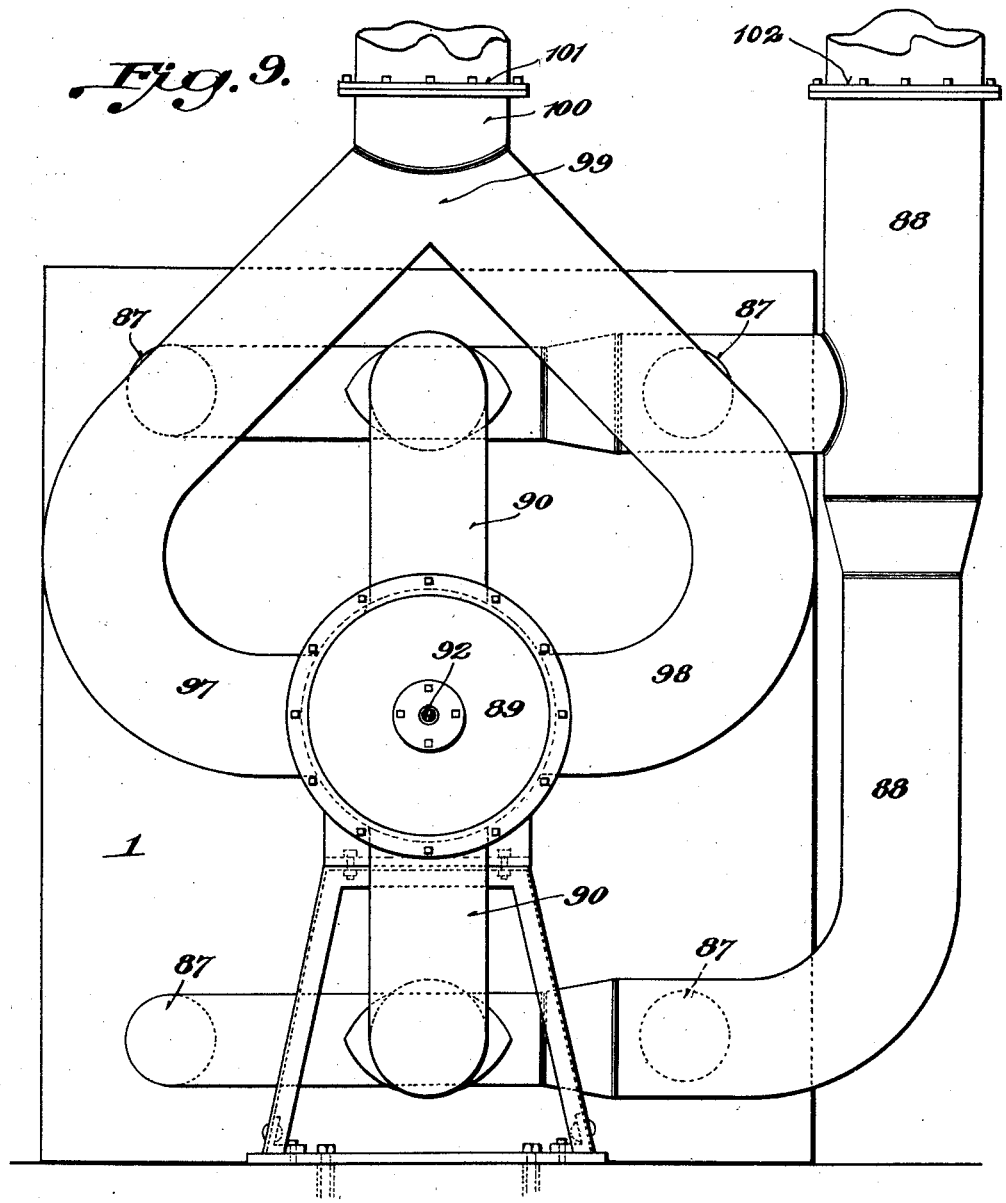

Patented Sept. 15, 1925.

1,553,667

UNITED STATES PATENT OFFICE.

WILLIAM C. BULL, OF BROOKLYN, NEW YORK.

APPARATUS FOR FABRICATING REENFORCED GLASS.

Application filed June 26, 1924. Serial No. 722,518.

*To all whom it may concern:*

Be it known that I, WILLIAM C. BULL, a citizen of the United States, residing at Brooklyn, in the county of Kings and State of New York, have invented certain new and useful Improvements in Apparatus for Fabricating Reenforced Glass, of which the following is a specification.

This invention relates to a novel and practical apparatus for fabricating laminated or reenforced non-shatterable and scatterless glass, composed of sheets of plate glass united by and reenforced with transparent cellulose material, pyrolin, viscose, and casein, or equivalent materials.

The method followed in the present invention includes the feature of producing a laminated glass product in which a sheet or layer of transparent cellulose material or its equivalent is placed between the sheets of glass and united thereto by heat and pressure. The transparent element of such a unit is preferably celluloid, in different forms, gelatin and the like, and suitable solvents are also preferably employed. In the use of binding or cementing agents of this character it is preferred to first coat the glass with a gelatinous preparation and to employ a soluble liquid of hydroscopic properties for the purpose of softening or making sticky under elevated temperature the said gelatinous coating on the glass and at the same time acting as a solvent in common between the gelatinous coating and the pyrolin or other intermediate membrane.

One of the essential prerequisites to obtaining a good product involving the foregoing elements is to exclude moisture from the material during the cementing operation. Moisture not only interferes with the adhesive action of the cementing agent but also hinders the exhausting or expelling of excess solvent, gases, and combined air; and furthermore, if absorbed by the cellulose material produces flaws and otherwise affects the homogeneity and transparency of the product. Another important consideration in the manufacture of this type of glass is to subject the laminated unit to uniform pressure and heat throughout the entire area of each unit in order to obtain a complete uniform adhesion of the glass to the cementing agent to insure a product possessing the desired standard of perfection as well as strength or power to effectually resist shock, jar, or penetration, and also insuring the necessary adherence of the fragments of glass to the inherent binder in case of breakage.

Heretofore, the apparatus employed for making glass of this character has involved hazards of production which have seriously interfered with the manufacture of this product on a successful commercial scale. Therefore, it is one of the primary objects of the present invention to provide a simple, practical and reliable type of apparatus constructed with a view to eliminating many of the objectionable elements and accessories heretofore required thereby not only reducing the risk of loss of production through accident and improper handling, but also effecting material operating and overhead savings which consequently result in a more economical product.

To that end, the present invention contemplates an apparatus involving only nominal initial outlay and requiring a minimum of upkeep in operation while at the same time producing a material superior in all respects to any similar product heretofore developed. In that connection the present apparatus consists of a self contained unit constructed and designed to utilize electrical heating means, and simple and dependable mechanical means for producing the required pressure, the heating means as well as the pressure means being at all times under automatic control, thereby eliminating the attention of a skilled operator during the treatment period, subsequent to the first fifteen minutes initial treatment period.

Another object of the invention is to provide an apparatus having the capacity for treating the material in quantity under the same favorable conditions as smaller units might be treated, and without incurring further risk or danger to the product or the operators. That is to say the invention has in view the provision of a novel electric oven which is readily accessible through doors opening at one side, and which contains a novel multiple press device adapted to operate on a plurality of glass units to be treated, and which units after the completion of the cementing or uniting period may be properly cooled and removed with facility without the necessity of unnecessary handling or lifting during the discharging operation.

A further object of the invention is to provide an oven of substantially steel construction, having attached thereto mechanisms for manipulation of moving parts, electric heating elements so connected and distributed about the interior, whereby proper temperature is obtained; a novel air circulating system; a simple and practical arrangement of instrumentalities on a single panel board for indicating the various stages of the process, and said panel board also carrying the terminals of the electric feed lines, the necessary switches for controlling the currents of the heating element and the electric motors for the press and circulating system together with such other accessories incidental to the proper, safe, and economical control of the apparatus in all of its functions.

A still further object of the invention is to provide a novel multiple press unit providing a magazine for the glass units, which magazine may be subjected to currents of hot or cold air directed at and through the edge of the units thereby effecting a more uniform distribution of the proper temperature to the glass at all stages of the fabricating operation.

While the invention necessarily is susceptible of a wide range of structural modifications as to details without departing from the essential and fundamental features of construction a preferable and practical form of construction, by way of example, is shown in the accompanying drawings, in which:

Figure 1 is a front elevation of an apparatus showing one of the doors closed and a fractional part of a door broken away to show the interior structural work, control panel board, and operating mechanism surmounting the structure.

Figure 2 is a horizontal section along line 2—2.

Figure 4 is an exterior plan looking downward upon the entire apparatus, with a corner section broken away showing mechanism actuated by closing or opening one of the doors.

Figure 5 is a horizontal section on the line 5—5 of Figure 3.

Figure 6 is a vertical section on the line 6—6, of Figure 8.

Figure 7 is a longitudinal section on the line 7—7 of Figure 4.

Figure 8 is a longitudinal section on the line 8—8 of Figure 4.

Figure 9 is an elevation on the line 9—9 of Figure 4.

Figure 10 is a detail of one of the heating elements and its connection to the bus bars.

Figure 11 is a detail of two heating elements showing how all heating elements are connected to the bus bars in pairs of double arm brackets.

Figure 12 is a detail spacing stud showing deformed supporting bar.

Figure 13 is a detail showing portion of two platens with material and press pads interposed.

Similar reference characters designate corresponding parts throughout the several figures of the drawings.

Figure 3:
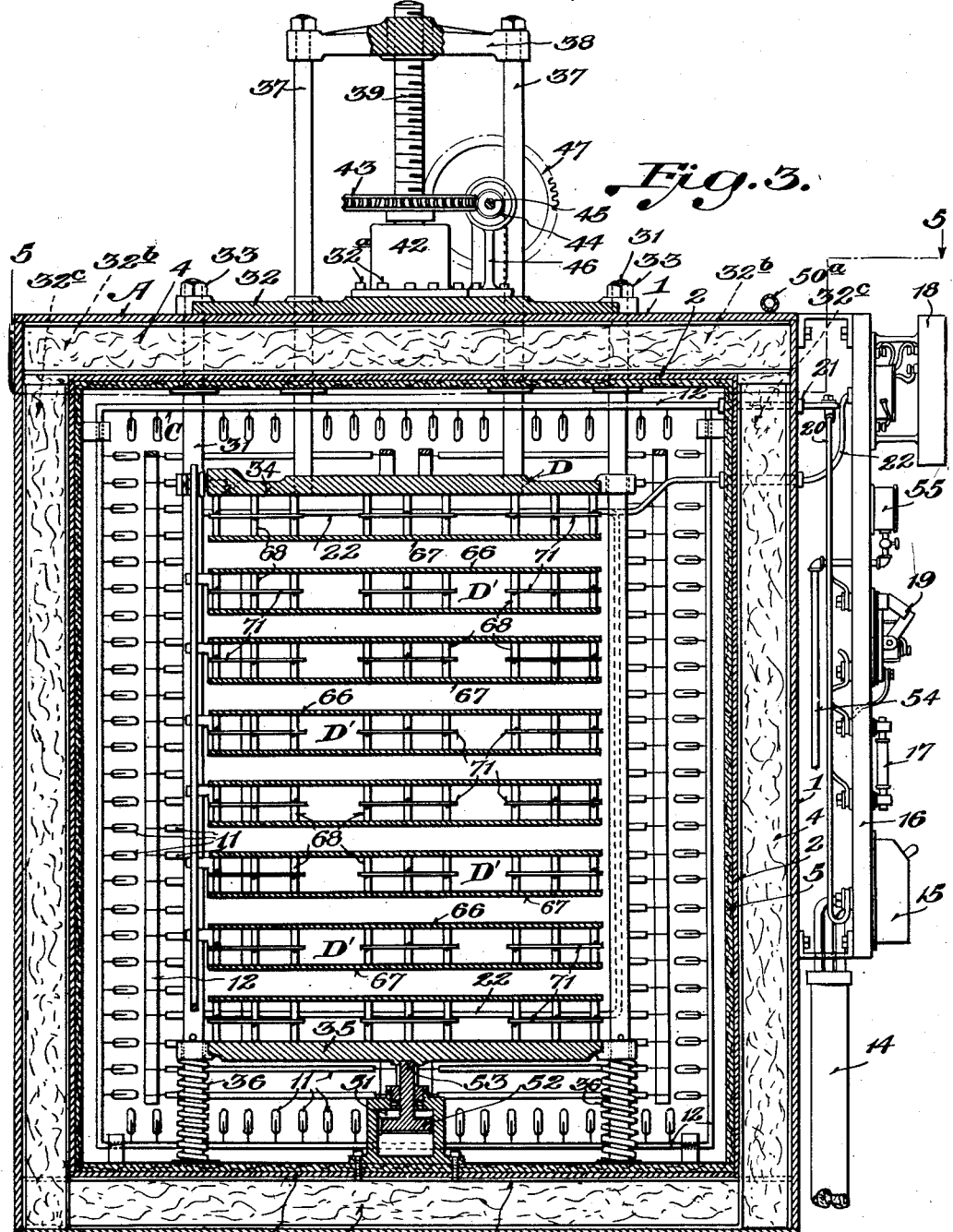
Figure 3 is a vertical transverse section along line 3—3 of Figure 4.

In carrying the present invention into effect it is proposed to provide a suitable casing or container constructed to provide an oven for retaining heat and at the same time containing and housing the necessary instrumentalities for making the product hereinbefore referred to. Therefore, according to the embodiment of the invention shown in the drawings, the same includes in its organization an oven designated generally as A and having the doors B at one of the vertical sides thereof while the interior of the oven contains and houses the electrical heating means C and a novel multiple press device D operated by an exterior power unit E preferably mounted on the top of the outer casing or shell of the oven. The said multiple press device D constitutes one of the novel and distinctive features of the present invention because it not only provides means for treating a number of glass units at once, but also because it provides greater accessibility owing to the fact that it may be reached readily through the doors B which swing open at one side of the cabinet, thereby greatly facilitating the charging and discharging of the magazine-like press device.

At the side of the oven opposite the doors B there is provided a novel air circulating unit designated generally as F. This unit includes means for exhausting air from the oven chamber to remove moisture at the beginning of the treating period, and also means for circulating heated air through the units of the press device in such a manner as to uniformly distribute the heat, and then subsequently subject the units of the press device to a blast of cooling air which is also effectively distributed. The circulating unit F is not only important because of the fact that it exhausts air from the apparatus to the extent of producing a partial vacuum which is essential to the removal and dispersion of vapor and gases during the preliminary stage of the cementing process, but it is also important because it effects a ready interchange of heated air from and to all parts of the oven uniformly and without overheating the edges of the material in the press units, and also preventing the intermediate portions of the units from becoming heat pockets.

Another important feature in connection with the air circulating unit is that the conduits are so arranged with reference to the stack of press units and to the area of the oven, that all movement of the air is from the center of the oven toward the outer sides thereof so that the heat from the electrical heating element C surrounding the press device will be readily conducted and distributed throughout the central part of the apparatus to keep the intermediate units always at the proper state of efficiency. Likewise a similar path or circuit for the cool air currents uniformly assists in the cooling operation necessary to permit an operator to comfortably remove the product from the oven.

Referring now more particularly to the details of construction of the example of the invention shown in the drawings it will be observed that the oven A preferably consists of an outer shell formed of a plurality of casing plates 1 and an interior shell formed of the interior casing plates 2, the same being spaced apart by suitable structural shapes 3 which not only act as spacing elements but also serve to reenforce the oven and materially contribute to its strength and rigidity. The space provided between the inner and outer shells 1 and 2 is preferably filled or packed with heat insulating material 4 such for example as celite asbestos or other suitable material, thereby to further assist in retaining the heat. Also the exposed face of the inner shell 2 may be protected by sheets 5 of asbestos lumber to aid the conservation of heat and also insulate the casing from the electrical heating element C. As previously indicated one vertical side of the casing is provided with the doors B which are inset within the limits of the casing and are provided with suitable locks or clamps 6 which keep the same tightly closed or seated against the sealing gaskets 7 arranged at the inner edge of the door frame. The inside faces of the door are also covered by sheets of asbestos lumber 8 and the interior of each door is filled with insulation material of the same type used in insulating the space between the inner and outer shells. To further assist in providing smooth and unobstructed surfaces for the ready deflection of air currents within the oven without temperature loss, the inside faces of the doors B are each provided with the baffle plates 9 of relatively thick sheets of asbestos lumber or equivalent material, the same being spaced from the face of the door by suitable fastenings 10 as clearly shown in Figures 5 and 8 of the drawings.

The heating means C employed in the present invention consists of a plurality of elongated bar-like electrical heating elements 11 which are supplied with electrical energy from the bus bars 12 extending around the top, bottom, sides and rear of the oven, and supported by suitable insulating brackets 13 or their equivalent.

Therefore, it will be understood that the present invention aims to include a dry and safe heat produced by electrical energy, the same being distributed about the interior of the oven on all sides except the front, thereby providing in effect a skeleton cage of heating elements through which the air may freely circulate and which by reason of their relatively large surface area readily and quickly produce heat necessary to the cementing operation. The bus bars 12 are supplied with electrical energy from any suitable and convenient source of electrical power as for example from the power mains designated as 14 in Figure 3. These mains or lines connect with a main switch device 15 mounted on the lower end of a panel board 16 carried by suitable brackets on one of the side walls of the outside shell 1 of the oven, and said switch device is in turn connected with suitable fuses 17 also mounted on the panel board. These fuses electrically connect with a thermostat device 18 carried by the panel board 16 and having associated therewith a switch device 19 located in the line 20 which connects with the bus bar extensions $12^a$ as shown in Figure 5 of the drawings. The said bus bar extensions pass through insulators 21 in one of the side walls of the casing thereby to connect with the bus bars proper within the oven, which bars, it will be understood, are used in any desired number or quantity dependent upon the type and phase of the electrical current available where the apparatus is to be installed.

The thermostat 18 is intended to insure positive control of uniform temperature throughout the process of treating the material, and therefore, to that end the said thermostat device 18 has connected therewith a small flexible capillary tube 22 (Figure 5) containing mercury, ether, or other volatile liquid responsive to heat influence, the said tube being threaded around and about the press unit D to insure a complete encircling thereof so as to readily obtain the average temperature of the material under treatment. As previously indicated the thermostat device 18 has associated therewith the automatic switch device 19 which may be set to automatically cut off the electrical current supplied to the heating elements at a predetermined degree of temperature known to be required for the proper treatment of material.

Another feature of the invention which insures maximum safety to the operator resides in the provision of a door controlled switch 23 in the line from the main power line 14 to the bus bars 12. This switch, which may be of any standard type readily available for the purpose, is operated by a connecting rod 24 slidably mounted in brackets 25 and tensioned by a spring s. The upper end of the rod 24 is connected to an arm 26 of insulated material, the said arm being keyed to the rock shaft 27 journaled as at 28 to the outer casing plate and one of the structural elements 3. The shaft 27 just referred to has keyed to its inner end a pendent arm 28 (Figures 1 and 8) adapted to hang and freely operate through a slot 30 in the upper edge of the door frame which receives the right hand door B. When the door is open the arm 29 will swing through the slot and thus cause the shaft 27 to rock and elevate the rod 24 against the tension of the spring s, thereby opening the circuit and cutting off current to the electrical heating elements 11. On the other hand when the door is closed the arm 29 will be rocked back to position shown in Figure 8 and the circuit will be complete so that if the main control switch 15 is also closed current will be immediately turned into the bus bars 12.

It will therefore be apparent that the present invention has in view the effective distribution of heating elements which may be readily controlled to produce the desired welding or cementing temperatures, and at the same time insure the safety of the men working about the oven and also to safeguard against over-baking or burning of the product.

One of the primary and distinctive features of the invention is the novel multiple press device D which is surrounded on all sides except one by the bar-like elements of the heating cage C. This device is arranged and constructed not only to provide facility in placing and removing the product from the press but also to compel the even distribution of heat to all parts thereof to insure uniform adhesion between the glass and the binding membrane so that every portion of the glass will be subjected to substantially the same degree of heat.

Referring first to the general structural features and characteristics of this device D it will be observed from Figures 3, 5 and 7 for example, that the interior of the oven is provided with four guide posts or columns 31 whose lower ends are embedded in the bottom of the oven while the upper ends thereof project through the top wall of the oven and serve to assist in holding the base plate 32 of the compression means in place. That is to say, the upper ends of the columns 31 project through the top of the oven and are reduced in diameter to fit into holes in the cast motor-assembly base plate 32, thereby to receive the nuts 33 for rigidly locking the base plate of the compression means to the oven, and also having the advantage of preventing the focusing of compressive strains at any one point of the oven.

The vertical columns or posts 31 not only serve to assist in holding the base plate of the compression means in place as above indicated, but more especially serve as guides for the top and bottom press plates respectively designated as 34 and 35 and having holes or eyes in the corners thereof for receiving said columns 31 or equivalent means for retaining the press plates 34 and 35 in relatively fixed positions. For example the columns may be structural angle members engaged by projections or lugs on the edges of the plates 34 and 35, the said members extending the full height of the oven and also serving to anchor the base plate 32 as previously indicated. The bottom press plate 35 is cushioned upon coiled compression springs 36 which are sleeved about the lower ends of the columns 31, while the top press plate 34 is carried by compression rods 37 extending through the motor assembly base-plate 32 and are united to a cross-head 38 which is of special design as indicated in Figs. 3 and 5 so as to receive all four of the compression rods 37 and uniformly transmit thereto either the compressive or lifting force of the screw 39.

The screw 39 has its lower end 40 (Fig. 8) journaled in thrust ball bearings 41 contained within a thrust chamber 42 mounted upon the base-plate 32. The upper end or cover portion of the housing 42 which provides the thrust chamber also constitutes part of the mounting for a worm gear 43 adapted to mesh with the worm 44 keyed to the horizontal shaft 45, said shaft being mounted in suitable frictionless ball and thrust bearings 46 (Fig. 4) and having at one end thereof a spur gear 47 which in turn meshes with a pinion 48 on the shaft 49 of an electric motor 50. This motor 50 is attached to the cast iron base-plate 32 to assure rigidity and alignment of operating parts.

It will therefore be seen that the compression means constituting the four compression rods 37, the cross-head 38, screw 39 and the motor driven connections for operating the same are all mounted on the base-plate 32 so as to produce stability and insure accurate application of the compressive force to the press device D. In that connection the base-plate 32 is of importance because it provides for uniformly distributing all pressure of the screw thrust exerted by the compression unit to a strain absorbing frame. That is to say, the said plate is bolted as indicated at 32$^a$ in Figs. 4 and 8 to the I-beams 32$^b$ located between the inner and outer shells 1 and 2 at the top of the oven and supported by vertical tension columns 32$^c$ located in the side walls of the oven. The I-beams 32$^b$ are bolted to the vertical I-beams 32ᶜ thereby to absorb the opposing push generated by the pressure screw 39 and the compression chamber 51 located between the bottom press plate 35 and the floor of the inner shell 2, the said compression chamber 51 being arranged directly over and supported by the structural elements or I-beams 32ᵈ (Figs. 7 and 8) which are connected with the vertical beams 32ᶜ and correspond to the upper beams 32ᵇ.

It will therefore be seen that the I-beams 32ᵇ, 32ᶜ, 32ᵈ form a rigid rectangular frame structure confined within the hollow walls of the oven to cooperate with the base plate 32 to insure the proper distribution of the compressive force necessary to the operation of the press device D.

The compression chamber 51 located beneath the bottom press plate 35 is formed by a suitable cylinder or housing filled with glycerine, oil or other suitable composition and also having therein a plunger head 52 actuated by a stem 53 connected with the lower press plate 35. As shown in Fig. 8 the chamber 51 has communicating therewith a pipe line 54 which extends exteriorly of the oven as shown in Fig. 1 and communicates with a pressure gauge 55 on the panel board 16. This pressure gauge is intended to register the degree of pressure imposed on the bottom press plate 35 and the superposed press units and preferably operates in conjunction with an automatic switch device (not shown) for controlling the current to the motor 50 so that when a predetermined pressure has been reached the switch will automatically stop the motor 50 and cause the screw press to cease operation. The pressure reached at the time the motor is stopped will be retained upon the material in the press for the required period of time, and at the conclusion of such period the motor 50 may be reversed and the screw 39 will also be rotated in a reverse direction to release pressure from the entire press device.

In connection with the feature of the automatic control of the upward travel of the compression rods 37, it will be observed from Figs. 1 and 8 that an automatic switch device designated generally as G may be employed to cut off the current to the motor 50 when the predetermined maximum height of the compression rods 32 and consequently the top press plate 34 has been reached. This device G consists of a snap switch 56 of suitable type having a switch arm 57 adapted to be engaged by an operating arm 58 provided with a collar 59 and guided in the laterally offset eyes 60 carried by one of the compression rods 37. When the compression rods reach the predetermined limit of upward travel the lower guide eye 60 will engage the collar 59 to operate the snap switch 56 and thus break the motor circuit which runs through the conduit designated as 50ᵃ in Figs. 4, 7 and 8. The conduit 50ᵃ leads to a master control switch 50ᵇ located on the panel board 16 and serves to manually control the circuit to the motor 50.

With the construction described it will be readily apparent that the press device D is controlled manually and automatically as to certain of its operations to insure maximum efficiency in operation at all steps of fabrication. The compression rods 37 and their motive equipment cause the upper press plate 34 to rise and fall as required, thereby compressing the intermediate press units which will presently be described more in detail and transmitting the compressive force of the screw 39 through such intermediate units to the bottom press plate 35. The assembly of the compression rods 37 with reference to the top press plate 34, and the cross head 38, is such that a true perpendicular compressive force is obtained thereby avoiding crushing or breaking down of any of the glass plates due to uneven pressure being concentrated or focused at any particular point or edge of the press unit.

The top press plate 34 carries at the opposite sides thereof depending lifting bars or links 61, the said bars being pivotally suspended from the side edges of the plate on the studs 62. These bars are provided with slots 63 which progressively increase in length toward the bottom of the links and receive therein the laterally projecting studs 64 of the hanger blocks 65 arranged between the upper and lower platens 66 and 67 respectively which constitute the upper and lower sides of the individual press units designated generally as D¹.

The intermediate and individual press units which are intended to receive therebetween the plates of glass to be pressed together have been especially designed and constructed with a view to uniformly absorbing heat throughout their areas. As previously indicated uniformity of temperature during the cementing operation is essential and therefore the platens of each unit are so constructed and assembled as to maintain rigid planity of the surfaces of the platens thereby contributing not only to a maximum dispersion of heat units to the entire metal surface of the platen but also transmitting the compressive force uniformly to all parts of the glass being treated.

By reference to Fig. 13 of the drawings it will be observed that the individual press units D are of substantially open formation and are united at proper points by suitable spacing studs 68 and 69. The studs 68 are adapted to cooperate with screws 68ᵃ counter-sunk in the plates 66 and 67 thereby to clamp the platens to the post while the posts 69 serve merely as additional spacers to add to the rigidity of the unit. As shown in Fig. 12 the intermediate portion of each post is provided with a burr 70 deformed from the post approximately mid-way of its length. These burrs constitute stops or anchors for supporting horizontal baffle plates 71 which are provided with openings corresponding to the diameter and spacing of the posts for purpose of receiving the same and maintaining the posts in the proper spaced relation, when assembled. Therefore, the baffle plates 71 serve to assure a fixed and permanent location of the separating studs, and also have a further and second purpose, namely, that of acting as guides or vanes for deflecting air currents through and between the units $D^1$ and to also serve in the better absorption and distribution of heat units. Thus, the plates 71 serve as baffles or separators for deflecting air currents upward and downward against the platens 66 and 67 and against the studs 68 and 69, and also serve to overcome and obviate the normal tendency of a high temperature central air zone being established practically mid-way between the plates 66 and 67. In other words the plates 71 serve to split up the air volume in its path through the apparatus, and establish a practically uniform temperature over the exposed area of the platens 66 and 67, thereby insuring a uniform conduction of the heated air to the material being treated over the entire area of the platens.

The construction of the units $D^1$ as above described has resulted in obtaining not only a uniformly high quality of product but a very material saving in time period devoted to the cementing operation, as well as a marked saving in electric consumption, with proportionately less resultant costs.

As previously indicated, all of the individual press units $D^1$ are suspended by and from the upper press plate 34 through the medium of the slotted links 61. When the upper press plate 34 is elevated to its maximum limit, all of the units $D^1$ will be separated as shown in Figs. 1, 3, and 7 for example, thereby to permit the insertion of the glass plates 72 having the intermediate binder 73 between the top platen 66 of one unit and the bottom platen 67 of the superposed unit. For the purpose of preventing direct contact between the metal platens and the glass plates 72, suitable cushions 74 of rubber or its equivalent may be employed. After the glass plates 72 and the cushion element 74 have been placed between the spaced individual press units $D^1$, the doors B of the oven may be closed, the heat turned on and the compressing operation started simultaneously with the exhaustion of air from the oven by the circulating unit F arranged at the rear thereof and which will now be referred to in greater detail.

The circulating unit F includes in its organization means for moving air currents in three different cycles, the first cycle being an exhausting cycle for the purpose of scavenging the moisture and gases and producing a partial vacuum in the oven, the next cycle being the manipulation of a closed heated air circuit for the purpose of properly heating up the charge within the oven and the third being a cooling cycle which involves the supply of outside air to the oven for the purpose of cooling the finished product so that the same may be conveniently handled.

In the above connection one of the important features of the air circulating means is to concentrate and direct all of the air currents to the center and thence outward toward the sides of the oven, thereby insuring the direct transmission of hot and cold air currents through the relatively open and cell-like formation of the press device D, special attention being always given to the proper balance and distribution of air currents to avoid the excessive heating or starvation of one portion of the oven at the expense of another, and to also enable the operator to more accurately control the time period for each step of the heating and cooling process.

The circulating unit is shown in detail in Figs. 4, 5, 6, 8, and 9, and by reference to Fig. 8, it will be observed that the same includes a central conduit 75 having an inwardly flaring mouth portion 76 communicating with a distributing chamber 77 formed by a casing 78 carried by the rear wall of the oven. The front baffle wall 79 of the casing 78 is provided with a plurality of circular openings 80 (Fig. 6) whose edges are chamfered or bevelled at an angle of not less than 45° as indicated at 81 for the purpose of assuring the development of the large body of air to be constrained within the baffle enclosure 82. Further advantage and merit is claimed for the bevelled port openings, and their adaptation in this apparatus, is, that during the initial stage of treatment when a vacuum is being maintained, the withdrawing power of the fan is increased and the outward movement of the air materially accelerated, thereby adding effectively to the shortening of this period of the process, also contributing to the economy of the operations.

The chamber 77 is constructed of asbestos lumber or other material of low thermal capacity and serves to repress or retard and also better distribute the inward flow of air currents toward the press device D. The openings 80 in the baffle wall 79 aggregate only about 20% of the area of the central conduit 75 and therefore a static condition is created for the purpose of distributing the air at a low uniform velocity through the openings 80. The inward flow of air to these openings first comes in contact with a relatively small proportion of the heating elements 11 on the heating cycle, thereby increasing the temperature rise very gradually, and likewise raising the temperature of the material being treated with a moderation very essential to the most efficient and successful steps in the process. As shown in Fig. 8, the front baffle wall 79 of the distributing chamber 77 lies next to the bank or battery of heating elements 11 and on the opposite side of said heating elements, there is also provided a rectangular baffle frame 82 of approximately the same dimensions as the press device D and supported from the bottom of the oven on the brackets 83. The upper wall of this baffle frame 82 is inclined downwardly as shown in Fig. 8, thereby to assist in directing air currents to and from the press device D in a thoroughly practical and efficient manner.

That is to say the baffle frame 82 secures a delivery of a solid volume of air to the circulating spaces between the platens 66 and 67 of the units D', thus tending to constrain this air volume from being diverted or dispersed before coming into contact with the platens 66 and 67 and baffle plates 71. The baffle wall 79 is provided with the extensions 79ª and the top and bottom extensions 79ᵇ which provide a plurality of corner ports 85 as well as a plurality of intermediate ports 86 which establish communication with a rectangular channel or duct surrounding the static or distributing chamber 77, thereby establishing a passageway for communicating with the top, bottom and sides of the oven around and about the press device D as distinguished from to-and-through the press device as accomplished by the center conduit 75 and the baffling and directing instrumentalities associated therewith.

One of the distinctive features of the invention resides in arranging the rear bank of heating elements 11 between the source of air blast, namely the fan, and the press device D. When the oven is closed and the preliminary heat is applied, the fan is rotated so as to exhaust the moisture and gases and at the same time keep the heating elements relatively cool. Therefore, when the fan is reversed to circulate the air in the closed heating circuit the temperature of the rear bank of heating elements 11 will be relatively lower than the other heating elements, thereby preventing a blast of hot air being at once projected through the units D' of the press. In other words by reason of the cooling on the exhaust cycle, the rear bank of heating elements 11 will gradually work up to full heat when the closed heating circuit is provided instead of abruptly elevating the temperature of air flowing into the press unit and which would have the effect of raising the temperature of the press units and their charges too quickly.

At each of the rear corners of the oven are provided the corner pipes 87 that communicate with the rectangular passageway formed about the casing 78 of the static chamber 77 and the discharge flue 88, as shown in Fig. 9, and also with the fan chamber 89 through the medium of the branch conduits 90.

The fan chamber 89 communicates directly with the central conduit 75 and has mounted therein, a reversible fan 91 rotated by a shaft 92 extending through the fan chamber and controlled by a motor 93. The said motor 93 is supplied with current through conduit 94 which is controlled from a switch device 95 on the panel board 16 (Fig. 4), and the said motor is supported in any suitable convenient manner upon a stand 96 as shown in Figure 8. The fan 91 is preferably journaled in a casting 91ª which is carried by a bracket 91ᵇ supported directly from the floor or other support.

With reference to the fan chamber 89, it will be observed that opposite sides thereof are tapped by a divided flue including the ducts 97 and 98 which extend upwardly and communicate at a common junction point 99 to provide a common outlet section 100 which is fitted with a damper or cut-off 101 similar to the damper or cut-off 102 in the discharge pipe 88, namely, a sliding damper or valve member, as clearly illustrated in Fig. 4.

The purpose of the construction and arrangement of ducts and flues has been previously indicated but with a view to tracing the path of air currents during the three cycles, reference may be made to Figs. 8 and 9 from which these cycles may be more clearly observed.

The exhaust or vacuum cycle is accomplished by closing the discharge damper 102 in the discharge pipe 88 and opening the damper 101. When the fan 91 is operated with the dampers in the positions described, air will be exhausted through the central conduit 75 from the central part of the oven where the press units D' are located with the aid of instrumentalities between the central conduit 75 and said units. From said central pipe the air will be discharged into the fan chamber 89 and thence through the ducts 97 and 98 to exhaust through the common outlet 100. The purpose in having the divided ducts 97 and 98 is to accelerate the discharge of the air from the fan chamber and more evenly distribute the pull or suction induced by the fan on the moisture and gases confined within the oven. After the exhaust cycle has been completed, and damper 101 is closed, and the heating cycle is carried through. The fan 91 is reversed, and the heated air is circulated in a closed or continuous circuit by way of the central conduit 75, through the static chamber 77, through the bank of heating elements 11, baffle frame 82, and press device D until it strikes the deflecting or baffle plates 9 on the doors B. The air current is thus reversed and passes around the sides of the oven through the ports 85 and 86 and thence through the corner pipes 87 and the by-pass flues 90 into the fan chamber 89. The fan 92 continues to force the heated air current in this cycle as long as the cementing operation requires.

The cooling operation is accomplished by opening both dampers 101 and 102, and rotating the fan 91 in the same direction as in the closed circuit or heating cycle. The effect of opening both dampers and thus running the fan is to pull cool air through the pipe 100 and through the ducts 97 and 98 into the fan chamber 89 whereby the fan will project such air blast into the static chamber 77 thence through the baffle frame 82 and press device D toward the baffle or deflecting plates 9 on the doors B which will scatter the cooling blast and send it toward the sides of the oven. The damper 102 in the discharge line 88 being open, the cooling air current will follow the path of least resistance and pass through the ports 85, 86, corner pipes 87 and their connecting flues to the main discharge flue 88. This cooling operation is continued for such time as may be required for the material to attain a handling temperature thereby to facilitate its removal as a finished product.

The operation of the device is as follows:—

When the oven is to be charged, the individual units D' of the press device D are separated and the entire apparatus is at rest. The desired elements constituting the raw product are then inserted between the platens 66 and 67 of the individual press units D' through the doors B. Owing to the fact that the doors are open, the automatic switch device S being a complete cut-off will prevent current being accidently fed into the bus bars 12. When the press device is filled and the doors B are closed the apparatus is sealed, and the current is turned on in the heating element C. Simultaneously, with the gradual application of heat, a vacuum is induced by operating the fan 91 to expel air trapped within the oven through the fan chamber 89, ducts 97 and 98 and pipe 100. This procedure continues for a predetermined period to expel all moisture and gases generated by the effect of the rising temperature upon the assembled material, and then the damper 101 is closed. Also during the period of initial heat application and establishing of the vacuum, the compression means on top of the oven is started to operate and the material is subjected to the predetermined degree of pressure essential to secure complete contact of all interposed surfaces of material, and so maintain the pressure during the continued plastic state of the cementing membrane which is attained by the continued application of heat following the vacuum period. This further application of heat is effected by coursing the air in the closed circuit previously referred to by reversing the fan 91 and closing both dampers 101 and 102.

In connection with the heating cycle it is pointed out that the manner in which the heat is effectively dispersed and applied to the individual heating units assures a high standard of product due to the effective and uniform dispersion of the hot air circulated in the manner already described from the fan to the static chamber 77, thence through the baffle frame 82 and onto and through the platens 67 and 68 of the individual press units D'. The provision of asbestos or equivalent insulating material conserves the heat in such a manner that in combination with the most effective air movements, the cementing operation is accomplished in the shortest period, and yet at the same time with maximum and positive efficiency.

After the cementing operation has been completed, the cooling period is started by opening both dampers 101 and 102 and circulating the cool air through the apparatus as previously indicated.

I claim:—

1. In a laminated glass fabricating apparatus, a multiple press device including a plurality of press units of relatively open formation.

2. In a laminated glass fabricating apparatus, a multiple press device including a plurality of press units each including spaced apart platen members, and means between said members for deflecting air currents.

3. In a laminated glass fabricating apparatus, a multiple press device including a plurality of press units each including upper and lower platen members, means for holding said platen members rigidly spaced apart in their respective planes thereby to provide an air passage between said platens.

4. In a laminated glass fabricating apparatus, a multiple press device including a plurality of press units each having a central air space coextensive with the dimensions thereof.

5. In an apparatus of the class described, a multiple press device including a plurality of press units each comprising upper and lower metallic platen members, a plurality of spacing studs arranged vertically between said members, and means for connecting certain of said studs with the platens.

6. In an apparatus of the class described, a multiple press device including a plurality of press units each comprising upper and lower metallic platen members, a plurality of spacing studs arranged vertically between said members, means for connecting certain of said studs with the platens, and means carried by the intermediate portions of said studs for deflecting air currents passing between the platens.

7. In an apparatus of the class described, a multiple press device including upper and lower press plates, a plurality of intermediate press units comprising spaced platens, and means carried by the upper press plate for raising and lowering said press units.

8. In an apparatus of the class described, a multiple press device including upper and lower press plates, a plurality of intermediate press units comprising spaced platens, and means carried by the upper press plate having a differential sliding engagement with each of said intermediate press units thereby to successively raise and lower the same.

9. In an apparatus of the class described, a multiple press device including upper and lower press plates, a plurality of intermediate press units comprising spaced apart platens, a hanger stud carried between said platens of each unit, a link pivotally carried by the upper press plate and having a plurality of slots of different length adapted to receive the hanger studs of said platens, and means for raising and lowering said upper and lower press plates.

10. In an apparatus of the class described, an oven, heating means therein, a multiple press device including a plurality of vertically separable spaced apart press units of open formation, and means arranged at one side of said press units for coursing air blasts through the same.

11. In an apparatus of the class described, a casing, a multiple press device consisting of a plurality of press units of relatively open formation, a bank of heating elements arranged at one side of said press units, and means for coursing an air blast from and toward said press units and through said bank of heating elements.

12. In an apparatus of the class described, an insulating casing, a multiple press device within said casing and consisting of a plurality of press units of relatively open formation, electrical heating elements arranged about the top, sides, bottom and rear of said press units, and means for coursing an air blast from and toward said press units and through the electrical heating elements arranged at the rear of said units.

13. In an apparatus of the class described, an insulated casing constituting an oven, a multiple press device within said oven, heating means arranged around and about said press device, and means on the outside of said casing for indicating the average temperature throughout the units of said multiple press device.

14. In an apparatus of the class described, an insulated casing constituting an oven, a multiple press device including a plurality of relatively open press units, heating elements arranged around and about said press device, a gauge on the outside of the casing, and a tube containing a thermal actuated fluid and connected with said gauge, and also extending about the press device.

15. In an apparatus of the class described, a casing, a press device including a plurality of individual press units having an air passage therebetween, means for exerting pressure on said units in one direction, and means for coursing air blasts through said units at right angles to the line of pressure application.

16. In an apparatus of the class described, a casing, a press device including a plurality of individual press units each having air passages between the platen surfaces thereof, air blast deflecting means in said passages, means for applying pressure to said units at right angles to the planes of said air passages, and means for coursing air blasts to and through said units parallel to the planes of said platen surfaces of the units.

17. In an apparatus of the class described, a casing consisting of spaced apart shell members, insulation filling said space between the shell members, structural elements arranged between the top, bottom and side walls of said shell members, a multiple press device arranged within the oven, means for supporting said press device on said structural elements, and a pressure applying unit for said press device also supported by said structural elements and having means extending into the casing for manipulating said press device.

18. An apparatus of the class described, comprising an oven, a multiple press device including a stack of horizontally arranged press units accessible through a side wall of the oven, heating means distributed in said oven about the press units, and means for coursing air currents through and about said press units parallel to the plane thereof.

19. An apparatus of the class described including an oven, a multiple press device including a stack of horizontally arranged press units, heating means distributed in said oven about the press device, means at one side of said oven for exhausting and circulating air in the oven, baffle means interposed in the line of air currents for directing air into and through said press device.

20. An apparatus of the class described including an oven, a multiple press in said oven and including a plurality of horizontally arranged press units, doors at one side of said oven whereby said press units may be accessible from one side of the oven, and means at the opposite side of the oven for exhausting air, circulating hot air, and feeding cooling air.

21. An apparatus of the class described comprising a heat insulated casing, doors at one side of said casing, a press device within said casing and including a plurality of horizontally arranged press units, means for successively operating said press units, heating means and a circulating unit communicating with the side of said casing opposite the doors and comprising means for exhausting air, circulating heated air, and injecting cooling air.

22. An apparatus of the class described comprising a heat insulated casing, doors at one side of said casing, a press device within said casing and including a plurality of horizontally arranged press units, means for successively operating said press units, heating means and a circulating unit arranged at the side of said casing opposite the doors and comprising a central conduit and a plurality of side conduits respectively communicating with the opposite corners of the oven and a fan chamber common to all of said conduits, means forming a distributing chamber communicating with the central conduit, and means arranged between said distributing chamber and the units of the press device for guiding and directing air currents therebetween.

23. An apparatus of the class described comprising a heat insulated casing, doors at one side of said casing, a press device within said casing and including a plurality of horizontally arranged press units, means for successively operating said press units, heating means, and a circulating unit arranged at the side of the casing opposite the doors and comprising a central conduit communicating with a fan chamber, a reversible fan in said fan chamber, side conduits respectively communicating with the corners of said oven and with the fan chamber, means within the casing for concentrating air currents in the zone of the press device, an exhaust conduit connected with said side conduits, and a two-way intake and exhaust conduit communicating with said fan chamber.

24. An apparatus of the class described including an oven having heating means therein, a multiple press device in said oven and including a plurality of superposed spaced apart horizontally arranged press units, means for producing a vacuum and uniformly distributing heat and cooling air currents to said press device, said means comprising a central conduit, a reversible fan in said conduit, means between the inner end of said conduit and the press device for focusing the currents of air through and about said press units, side conduits for moving the air from about the press device.

25. An apparatus of the class described including an oven having heating means therein, a multiple press device in said oven and including a plurality of superposed spaced apart horizontally arranged press units, means for producing a vacuum and uniformly distributing heat and cooling air currents to said press device, said means comprising a central conduit and a fan chamber communicating therewith, a reversible fan arranged between said conduit and the fan chamber, a two-way intake and exhaust flue communicating with the fan chamber, a plurality of side conduits communicating with the corners of said oven, a discharge conduit communicating with said corner conduits, a damper in said discharge conduit adapted to be closed when the fan is rotated in one direction thereby to produce a vacuum in the oven by drawing air through the central conduit and exhausting the same through the two-way flue, and a damper in said two-way flue adapted to be opened to provide a vacuum exhaust and adapted to be closed to provide a closed heating circuit when the fan is reversed to course the air through the central conduit and thence through the side conduits, and both of said dampers adapted to be open thereby to draw cooling air through the two-way flue section, course it through the oven and exhaust the same through the said discharge conduit.

26. An apparatus of the class described including an oven, a multiple press device including a vertical stack of horizontally arranged spaced apart press units, electrical heating elements arranged about the top, bottom, sides and rear of said press device, and an air circulating unit adapted to course air through the oven in the plane of said units and including a central conduit and side conduits located at the corners of the oven, a fan chamber establishing communication between the side conduits and the central conduit, a reversible fan between said chamber and the central conduit, a distributing chamber within the oven and communicating with the central conduit, a baffle unit arranged between the press unit and the rear electrical heating elements, said heating elements being also disposed between the baffle unit and the distributing chamber, and means in said circulating unit whereby air may be initially coursed to and through said press unit.

27. An apparatus of the class described including an oven, a multiple press device within said oven, electrical heating elements arranged about the top, bottom, sides and rear of said press device, and a circulating unit having means for exhausting air from said oven around the press unit through the same to provide a vacuum, other means for forming a closed hot air circuit from about the sides of said press unit where the heating elements are located about and through said press device, and further means for introducing cooling air currents directly over and about said press device and discharging the same toward the sides of the oven and thence to exhaust.

28. An apparatus of the class described including a doubled wall casing fitted with heat insulating material and providing an oven, doors at one of the vertical sides of said casing, a multiple press device arranged within said oven and including a plurality of horizontally arranged spaced apart press units, a plurality of electrical heating units arranged about the sides, top and rear of said press device within the oven, means on the exterior of said casing for operating the press device and an air circulating unit arranged at the side of the casing opposite the doors and having means for successively producing a vacuum within the oven, coursing heated air through the units of the press device, and then feeding cooling air to the oven.

29. An apparatus of the class described including a doubled wall casing filled with heat insulating material and providing an oven, doors at one of the vertical sides of said casing, insulating air baffle plates carried by said doors, a multiple press device including a plurality of horizontally arranged spaced apart press units arranged within the oven formed by the casing, a plurality of electrical heating elements arranged about the top, bottom, sides and rear of said press device, automatic switch means controlled by the doors for supplying current to said electrical heating elements, means on the outside of said casing for operating said press units, and an air circulating unit at the side of the casing opposite the doors and having means for successively producing a vacuum within the oven, coursing heated air through the units of the press device and then feeding cooling air to the oven.

30. An apparatus of the class described including a heat insulated casing providing an oven, a multiple press device arranged within said casing and including a top press plate and a bottom press plate, and a plurality of intermediate horizontally arranged spaced apart press units, means carried by said top press plate for manipulating the intermediate press units, means for resiliently supporting the bottom press plate, power means for manipulating the top press plate, and means associated with the bottom press plate for indicating the degree of pressure applied to the individual press units.

31. An apparatus of the class described including a casing providing an oven, a multiple press device in said oven, said device comprising top and bottom press plates and a plurality of intermediate horizontally arranged spaced apart press units, links carried by the top press plate and engaging with the intermediate press units to manipulate the same, means for resiliently supporting the bottom press plate, pressure gauging means actuated by said bottom press plate and means for manipulating the top press plate comprising standards connected with said top press plate, and automatic screw operated means for controlling said standards.

32. An apparatus of the class described including a casing providing an oven, a multiple press device arranged within said oven and comprising top and bottom press plates, a plurality of intermediate spaced apart horizontally arranged individual press units, links carried by said top press plate unit for lifting and lowering said intermediate press units, said links being provided with slots of progressively increasing length, and studs carried by said intermediate press units and riding in said slots, means for resiliently mounting the bottom press plate, and power means connected with the upper press plate for manipulating the top press plate and all of the press units.

33. An apparatus of the class described including an oven, a multiple press device in said oven including a top press plate and a bottom press plate, means for resiliently mounting the bottom press plate, power means for operating the upper press plate, a plurality of individual horizontally arranged and spaced apart press units arranged between the top and bottom press plates, each of said individual press units comprising upper and lower platen plates, a plurality of spacing studs for spacing said platen plates apart, certain of said studs having its opposite end portions respectively fastened to the upper and lower platen plates, baffle plates carried by the intermediate portions of said studs, and carrying blocks also arranged between said platen plates and means carried by the upper press plate for engaging with said carrier blocks.

34. An apparatus of the class described including a casing providing an oven, a multiple press device within said oven, a plurality of guide columns arranged within the oven, top and bottom press plates each having a guiding engagement with said columns, a plurality of individual horizontally arranged and spaced apart press units arranged between the top and bottom plates, means carried by the top press plate for carrying and suspending the intermediate press units, means for resiliently mounting the bottom press plate, pressure gauge means operated by said bottom press plate, means carried by the top of the casing for operating the top press plate, said means comprising standards connected with the top plate and power operated screw means for operating said standards.

35. An apparatus of the class described including a casing providing an oven, a multiple press device within said oven and including top and bottom press plates and a plurality of intermediate horizontally arranged and spaced apart press units carried and controlled by the top press plate, means for resiliently mounting the bottom press plate, pressure gauge means actuated by said bottom press plate, columns arranged within the oven and forming guides for the top and bottom press plates, said columns projecting through the top wall of the casing and exteriorly thereof, and means for operating the top press plate including a base plate mounted on top of the casing and secured thereto by nuts engaging the exteriorly projecting ends of said columns.

36. An apparatus of the class described including an outer casing shell and inner casing shell, structural elements for spacing the same apart, heat insulating packing arranged within the casing, doors arranged at one of the vertical sides of said casing, a panel board mounted on said outer casing, a plurality of electrical heating elements arranged about the top, bottom, side and inner rear walls of the inner shell, insulators for supporting said electrical heating elements, an automatic switch carried by said panel board and included in the circuit with said electrical heating elements, and means actuated by the movement of said doors for controlling said switch.

37. A laminated glass fabricating apparatus including an oven, a glass pressing device within the oven, and means for coursing air currents toward and from said glass pressing device, and a static air chamber arranged between said means and said press device.

38. A laminated glass fabricating apparatus including an oven, a glass pressing device within the oven, and means for coursing air currents toward and from said glass pressing device, and a static chamber having a foraminous wall and arranged between said means and said press device.

39. A laminated glass fabricating apparatus including an oven, a glass pressing device within the oven, and means for coursing air currents toward and from said glass pressing device, and a static air chamber arranged between said means and said press device and including a wall having a plurality of circular openings provided with beveled edge portions.

40. A laminated glass fabricating apparatus including an oven, a glass pressing device within the oven, a reversible fan unit arranged at one side of the press device, an air chamber having a foraminous wall arranged between said fan unit and the press device, and a baffle frame arranged between the foraminous wall of the static air chamber and the press device.

In testimony whereof I hereunto affix my signature.

WILLIAM C. BULL.